United States Patent
Weddeling et al.

(10) Patent No.: US 11,003,679 B2
(45) Date of Patent: May 11, 2021

(54) FLEXIBLE ADOPTION OF BASE DATA SOURCES IN A REMOTE APPLICATION INTEGRATION SCENARIO

(71) Applicant: SAP SE, Walldorf (DE)

(72) Inventors: Peter Weddeling, Sinsheim (DE); Tobias Hoehmann, Heidelberg (DE); Bare Said, Sankt Leon Rot (DE)

(73) Assignee: SAP SE, Walldorf (DE)

( * ) Notice: Subject to any disclaimer, the term of this patent is extended or adjusted under 35 U.S.C. 154(b) by 186 days.

(21) Appl. No.: 16/221,180

(22) Filed: Dec. 14, 2018

(65) Prior Publication Data

US 2020/0192907 A1 Jun. 18, 2020

(51) Int. Cl.
| | |
|---|---|
| *G06F 16/242* | (2019.01) |
| *G06F 16/25* | (2019.01) |
| *G06F 16/907* | (2019.01) |
| *G06F 16/21* | (2019.01) |
| *G06F 16/22* | (2019.01) |
| *G06F 16/248* | (2019.01) |

(52) U.S. Cl.
CPC .......... *G06F 16/252* (2019.01); *G06F 16/212* (2019.01); *G06F 16/22* (2019.01); *G06F 16/242* (2019.01); *G06F 16/248* (2019.01); *G06F 16/254* (2019.01); *G06F 16/907* (2019.01)

(58) Field of Classification Search
None
See application file for complete search history.

(56) References Cited

U.S. PATENT DOCUMENTS

| | | | |
|---|---|---|---|
| 9,432,298 B1* | 8/2016 | Smith | H04L 49/9057 |
| 2002/0169658 A1* | 11/2002 | Adler | G06Q 30/0205 705/7.28 |
| 2007/0078533 A1* | 4/2007 | Caldwell | G05B 13/04 700/37 |
| 2013/0290234 A1* | 10/2013 | Harris | G06N 5/022 706/46 |
| 2015/0205602 A1* | 7/2015 | Prismon | G06F 8/34 717/121 |
| 2019/0353378 A1* | 11/2019 | Ramamurti | F24F 11/62 |
| 2020/0151588 A1* | 5/2020 | Doan Huu | G06N 5/04 |

* cited by examiner

*Primary Examiner* — Wilson Lee
(74) *Attorney, Agent, or Firm* — Mintz Levin Cohn Ferris Glovsky and Popeo, P.C.

(57) ABSTRACT

A data source integration architecture is provided for integrating application systems with an analytics system for user querying and data retrieval. The integration includes flexibly configuring base data sources as defined by an analytical model of an application system, such as an OEM application. In response to a query, metadata is fetched from an application server, where the metadata may contain a description of underlying artifacts of the structural part of the analytical model. During query generation, these specific views are injected into a query view and a parametrization is added for data source modulation. In addition, a flexible configuration of the final shape of the base data source specifically allows for the requirements of the OEM application to be addressed.

20 Claims, 5 Drawing Sheets

```
"dataSourceDefinition": {
    "type": "CALCULATION_VIEW| SQL_VIEW  DATA_BASE_TABLE  CDS_VIEW| TABLE_FUNCTION ",
    "schemaName": "String (optional for calc views)",
    "packageName": "String",
    "objectName": "String"
},
```

```
"inputParameterReferences": [{
    "id": "String, instance Id of parameter",
    "fieldId": "String, column name of scope view",
    "parameterValue": "String, instance value of parameter, used if no fieldId specified",
    "parameterDataType": "String",
    "selectionType":"FUNCTION",
    "operator": "EQUAL_TO| GREATER_THAN_OR_EQUAL_TO| GREATER_THAN| LESS_THAN| LESS_THAN_OR_EQUAL_TO",
    "inputParameterOfHanaObject": "String, id of input parameter e.g. of table function"
}],
```

FLEXIBLE ADOPTION OF BASE DATA SOURCES IN A REMOTE APPLICATION INTEGRATION SCENARIO

FIELD

The present disclosure generally relates to integration of various data sources and, more specifically, to configuring application systems to be integrated with an analytics system for seamless user querying.

BACKGROUND

A multitude of application systems, such as various OEM application systems, may provide analytics capability for a user. An analytics application may rely on data from one or more such application systems or data sources that reside in their own data centers. The application systems may each have a unique data structure, and thus may require unique handling to expose requested data to the user.

SUMMARY

Methods, systems, and articles of manufacture, including computer program products, are provided for integrating application systems with an analytics system for user querying and data retrieval.

According to aspects of the current subject matter, a computer-implemented method includes: obtaining, by a processing component of an application system, an analytical data model of the application system, the analytical data model including base data sources and a structural definition of the application system; identifying, by the processing component, parameters from the structural definition of the application system; generating, by the processing component, modified data sources by injecting the parameters into the base data sources; executing, by the processing component, a query received by the application system from a user device, where the execution is based on the modified data sources; and providing, by the processing device and to the user device, results of the execution of the query.

In an inter-related aspect, a system includes at least one data processor, and at least one memory storing instructions which, when executed by the at least one data processor, result in operations including: obtaining an analytical data model of an application system, the analytical data model including base data sources and a structural definition of the application system; identifying parameters from the structural definition of the application system; generating modified data sources by injecting the parameters into the base data sources; executing a query received by the application system from a user device, where the execution is based on the modified data sources; and providing, to the user device, results of the execution of the query.

In an inter-related aspect, a non-transitory computer-readable storage medium includes program code, which when executed by at least one data processor, causes operations including: obtaining an analytical data model of an application system, the analytical data model including base data sources and a structural definition of the application system; identifying parameters from the structural definition of the application system; generating modified data sources by injecting the parameters into the base data sources; executing a query received by the application system from a user device, where the execution is based on the modified data sources; and providing, to the user device, results of the execution of the query.

In some variations, one or more of the features disclosed herein including the following features can optionally be included in any feasible combination. The base data sources may include metadata. The metadata may include a JavaScript object notation format definition of analytical metadata. The structural definition of the application system may include one or more of database tables, calculation views, structured query language views, table functions, and core data services. The application system may be integrated with an analytics application. Additional parameters form the query may be identified. The parameters may include predefined functions.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A is an example representation of a data source definition consistent with implementations of the current subject matter;

FIG. 2B is an example representation of parameters injected into a query definition consistent with implementations of the current subject matter;

Figure 1:
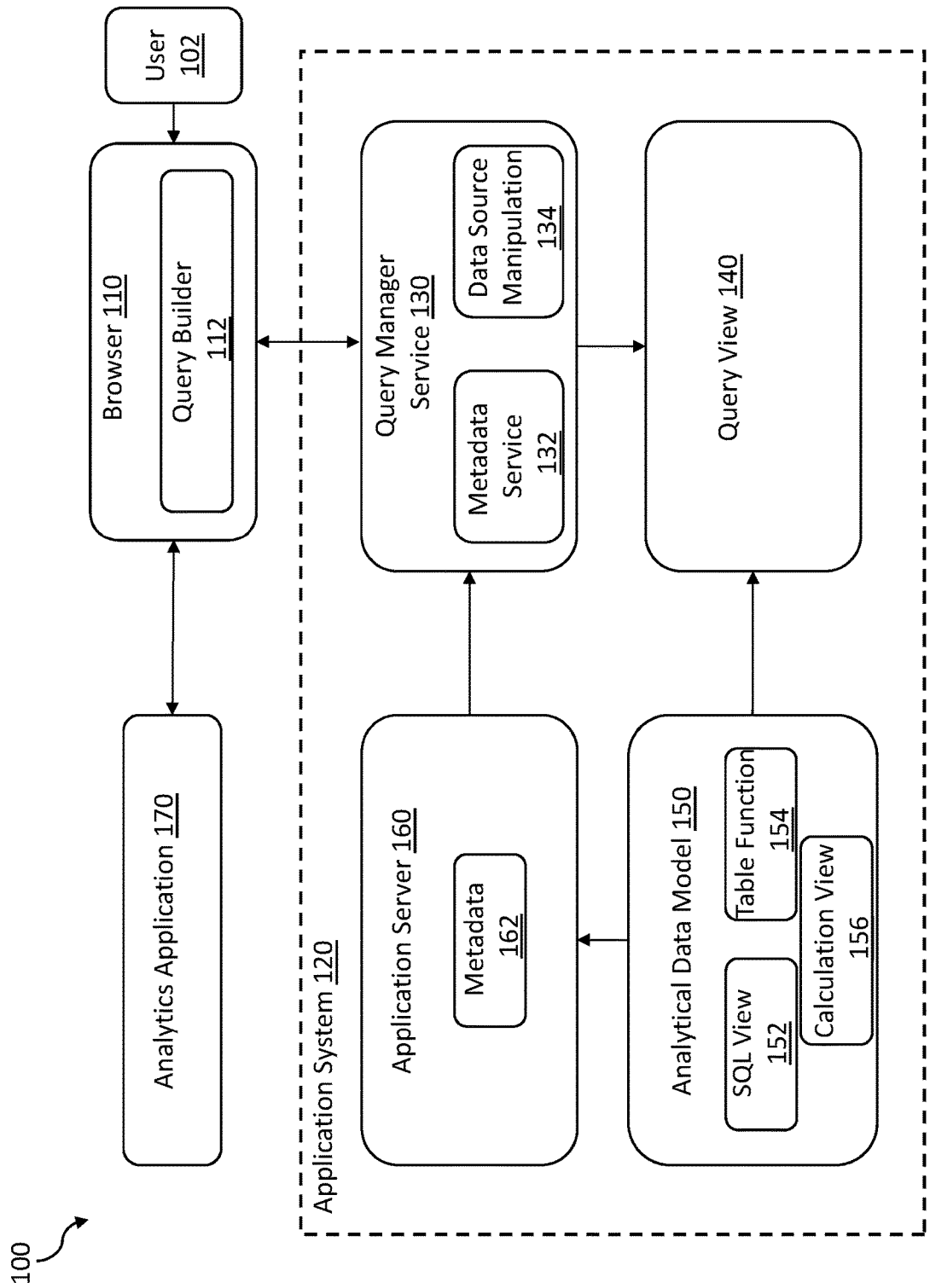
FIG. 1 is a block diagram illustrating a data source integration architecture consistent with implementations of the current subject matter.

Like labels are used to refer to same or similar items in the drawings.

DETAILED DESCRIPTION

A cloud-based analytics application may rely on data from one or more applications or data sources that reside in their own data centers. Remote access of data, for example transactional data, from the applications may be used directly for analytical purposes. That is, a user or customer may, through for example a web browser, access the cloud-based analytics application and present queries that require data from one or more applications or data sources.

Thus there is a need to integrate transactional application systems, such as OEM application systems, with a cloud-based analytics application. In some implementations, an advantage of such integration is that an integration avoids data replication from remote applications, thereby facilitating data management lifecycle.

Consistent with implementations of the current subject matter, an analytical data model from the application system that includes a metadata description and a structural definition by design time artifacts (for example, tables, views, and functions) is utilized to provide for flexibly adopting artifacts for consumption by an analytics cloud query. Implementations of the current subject matter include a parametrization approach and a fine granular adoption of highly specific customer models. The structural definition depends largely on a multitude of different requirements. Thus a variety of the data sources are adopted.

FIG. 1 depicts a block diagram illustrating a data source integration architecture 100 consistent with implementations of the current subject matter. The architecture 100 implements a method to flexibly configure base data sources as defined by the analytical model of the application, such as an OEM application, as described in detail herein.

A browser 110 allows for a user 102 to formulate and submit a query. The browser 110 includes a query builder 112 that communicates the query to the data source or application system 120 to process the query for consumption by an analytics application 170, which may be for example a cloud-based analytics application. The browser 110 allows the user 102 to access the analytics application 170 and present queries that may require data from the application system 120.

Consistent with implementations of the current subject matter, the application system 120 may include a query manager service 130, a query view 140, an analytical data model 150, and an application server 160.

In response to a query, metadata 162 is fetched from the application server 160. The metadata 162 may contain a description of underlying artifacts of the structural part of the analytical model. During query generation, these specific views are injected into the query view 140 and a parametrization is added for data source modulation, as further described herein. In addition, a flexible configuration of the final shape of the base data source specifically allows for the requirements of the OEM application to be addressed. According to some aspects, an example of a specific view may be a SQL view of an employee, including for example detailed information such as name, title, birthdate, and the like.

The thus configured and modified base data sources are integrated into the query view 140 by the query manager service 130, and are used on runtime execution, in order to retrieve the data and expose it to the end user 102. The query manager service 130 generates analytical artifacts including a metadata service 132 that retrieves the metadata and a data source manipulation 134 that creates the modified data sources.

The analytical data model 150 includes a metadata description and a structural definition by design time artifacts (for example, structured query language (SQL) view 152, table function 154, calculation views 156, and other functions). OEM applications may use a variety of different view types to describe the structural part of their analytical model. Implementations of the current subject matter provide for any of these underlying base views for consumption in the generated query view 140. The definition of the base data source may be provided by the application system 120 in the analytical data model 150. An example of a data source definition is provided in the representation 210 of FIG. 2A.

Consistent with implementations of the current subject matter, table function and calculation views may be configured with parameters. The parameters are injected or inserted into the query definition. Parameters may be either defined in the analytical metadata model 150 or by the query builder 112. An example representation of parameters injected into the query definition is provided in the representation 220 of FIG. 2B. The parameters may include predefined functions.

Consistent with implementations of the current subject matter, data source parametrizations are adopted. For example, the parameters are injected into the base data sources to generate modified data sources. Due to this dynamic adoption of data source parametrizations, it is possible to flexibly modify base data sources for usage in the query view 140. According to some aspects of the current subject matter, the query manager service 130 injects into a query specific data source information or parameters based on the data source type.

Figure 3:
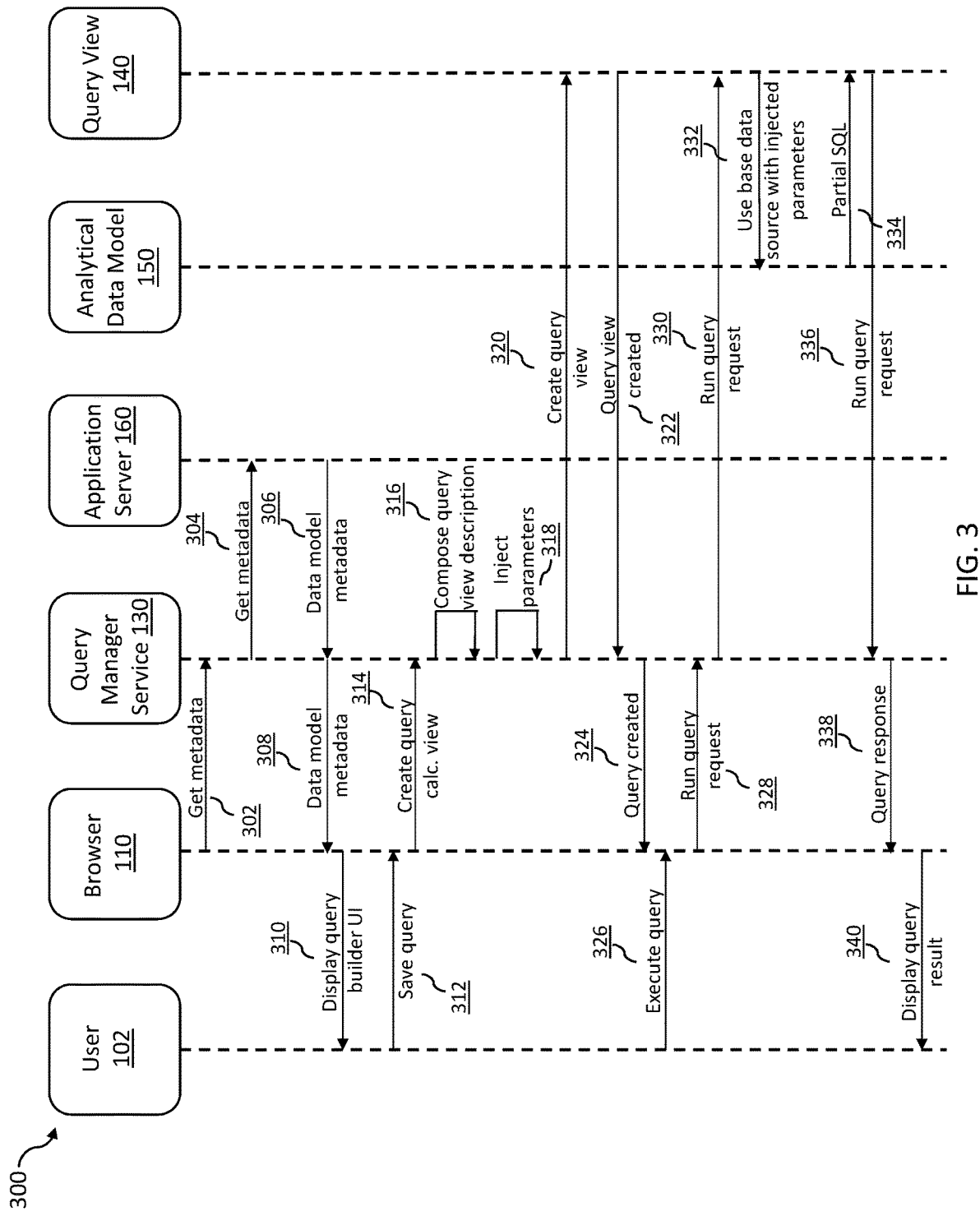
FIG. 3 is a sequence diagram illustrating a process flow of a data source integration architecture consistent with implementations of the current subject matter.

FIG. 3 is a sequence diagram 300 illustrating a process flow of the data source integration architecture 100 consistent with implementations of the current subject matter. The user 102 is logged into the application system 120 via, for example, standard logon procedures. The logon may initiate a "get metadata" command which involves retrieving a data model metadata from the application system 120. In particular, as shown in FIG. 3, a metadata request is sent from the browser 110 to the query manager service 130 (302), which forwards the metadata request to the application server 160 (304). The application server 160 retrieves the data model metadata from the metadata 162 and transmits it to the query manager service 130 (306), which forwards it to the browser 110 (308). The browser 110 uses the data model metadata to display a query builder user interface to the user 102 (310). The query builder user interface may include data source and parameter descriptions.

To create a query, the user 102 utilizes the query builder user interface and saves a query via the browser (312), which creates a query calculation view through the query builder 112 for transmission to the query manager service 130 (314). The query manager service 130 composes a query view description with the nested base data source (316) and injects parameters as part of the base data source (318). The query manager service 130 then transmits a create query view command to the query view 140 (320) for creation of the query view. The query view 140 transmits the created query view to the query manager service 130 (322), which sends a created query to the browser 110 (324).

A query may then be run to retrieve data via a request which may include permissions from an external application. The user 102 issues an execute query command via the browser 110 (326), which issues a run query request to the query manager service 130 (328). The run query request is transmitted to the query view 140 (330). The query view 140 provides the base data source with injected parameters to the analytical data model 150 (332), which creates and transmits to the query view 140 a partial SQL for the base data source (334). The query view 140 uses the partial SQL to generate a run query request, which is transmitted to the query manager service 130 (336). The query manager service 130 provides a query response to the browser 110 (338), which displays the query results to the user 102 (340).

As an example consistent with implementations of the current subject matter for integrating the application system 120 with the analytics application 170 for user querying and data retrieval, one application is the transposition of a field value pair type data base table into a structured data base model. For this purpose, the application system is providing a table function with a fixed set of parameters as a base data source. The table function is expecting field names as input parameter values. If, for example, values A, B, C are provided for the first three parameters, then an SQL part of the base table function is going to extract the corresponding values to field names A, B and C from the underlying data base table. The values are returned as a result set of the table function. The base data source as described in the analytical metadata model is just described as a table function using fields A, B, C. Hence, the technical representation of the field value pair table is completely hidden by the end user.

If the end user selects fields A, B, C in the query builder 112, the data source manipulation component 134 of the query manager service 130 takes these fields and adds them as parameter values to the three first input parameters of the underlying table function.

As an additional example consistent with implementations of the current subject matter for integrating the application system 120 with the analytics application 170, reduction of data source output may be considered. For example, a "where" clause may be injected into a standard base view data retrieval SQL query. The content of the where clause may be retrieved by an application server callback specifically for the application system 120, such as an OEM application.

Figure 4:
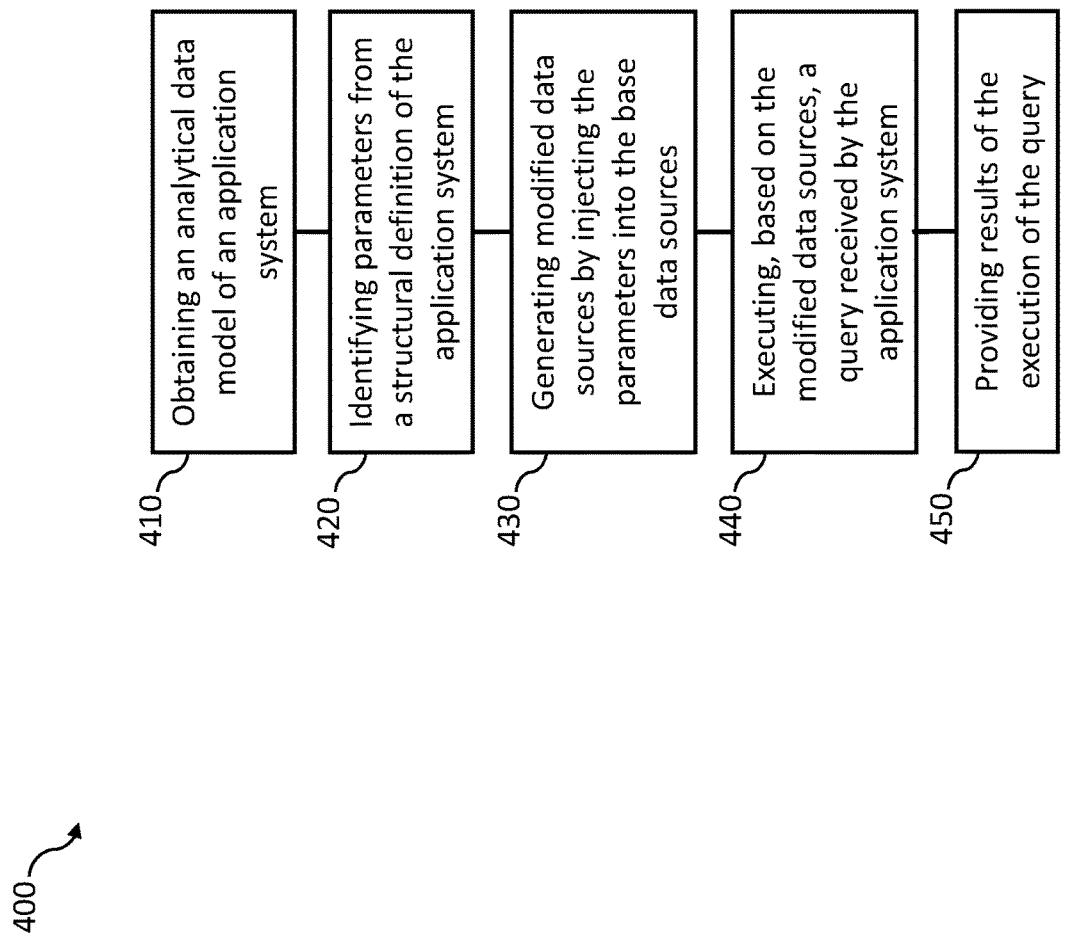
FIG. 4 depicts a flowchart illustrating a process for integrating application systems with an analytics system for user querying and data retrieval consistent with implementations of the current subject matter.

FIG. 4 depicts a flowchart 400 illustrating a process for integrating application systems with an analytics system for user querying and data retrieval consistent with implementations of the current subject matter.

At 410, an analytical data model of an application system, such as the application system 120, is obtained. The analytical data model may include, for example, base data sources and a structural definition of the application system. Consistent with some implementations of the current subject matter, the base data sources may include metadata, such as the metadata 162 that resides in the application server 160. The metadata may include, for example, JavaScript object notation (JSON) format definition of analytical metadata. Consistent with some implementations of the current subject matter, the structural definition of the application system may include one or more of database tables, calculation views, SQL views, table functions, and core data services that may reside in the analytical data model 150 of the application system 120.

At 420, parameters from the structural definition of the application system 120 are identified. The parameters are used to adopt the base data sources of the application system 120 for consumption of queries by the analytics application 170. The parameters may be either defined in the analytical metadata model 150 or by the query builder 112. The parameters are identified in the metadata service 132 per data source. Each data source may be enriched by an array of parameters including for example parameters with a constant value. Other parameters may be defined by a function, such as current date or currently logged on user. In addition, parameters may be defined which prompt the user 102 for input when running the query.

At 430, modified data sources are generated. The modified data sources are generated by injecting or inserting the parameters from the structural definition or the query into the base data sources. An example for a fixed parameter for the employee view described above is a Boolean flag which describes whether the returned employees are active or non-active. The parameter is returned via the metadata service 132.

At 440, a query received by the application system 120 from a browser, for example the browser 110, is executed. The execution of the query is based on the modified data source. At 450, the results of the execution of the query are provided to the user 102 via for example the browser 110.

Aspects of the current subject matter provide the data source integration architecture 100 to flexibly use various artifacts as base data sources for the consumption of an analytical query in the live integration between the analytics application 170 and OEM applications, such as the application system 120. This is achieved by configuring base data sources with parameters. Moreover, the base data sources are manipulated for OEM application specific use cases using a fine granular injection based on an OEM application adapter concept.

Figure 5:
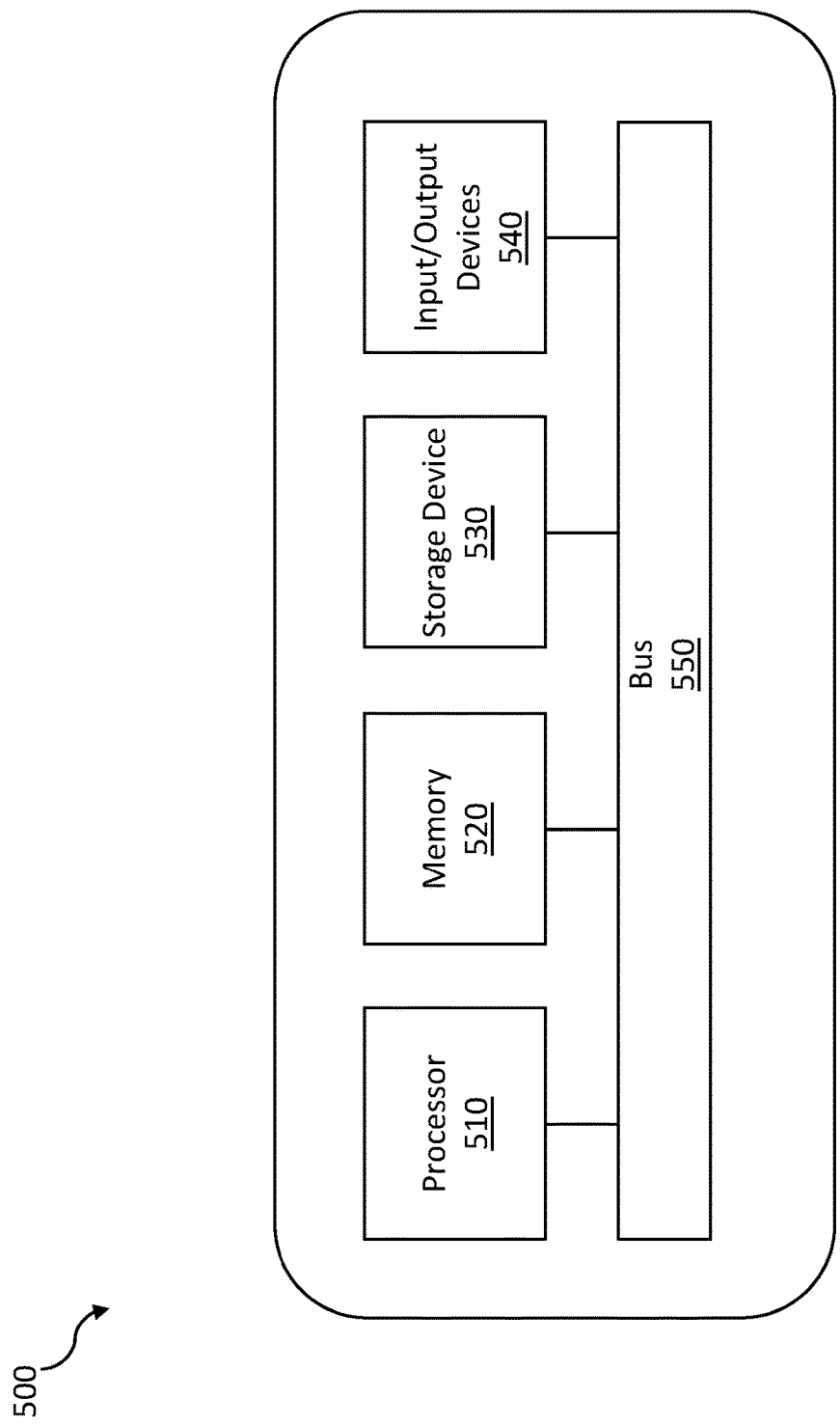
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1, 3, and 4, the computing system 500 can be used to implement the data source integration architecture 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the data source integration architecture 100. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
   responsive to a command initiated at a browser, providing, by a processing component of an application system and to a browser interface coupled to the application system, a data model metadata comprising a structural definition of the application system;
   generating, by the processing component and in response to a query initiated at the browser, a query view description including a data source and parameter description, the data source and parameter description provided by the browser;
   executing, by the processing component, the query received by the application system from the browser interface, the executing of the query comprising generating modified data sources by injecting parameters defined in the parameter description into base data sources of the application system to create a partial database query that is executed based on the modified data sources; and providing, by the processing component and to the browser interface, results of the execution of the query.

2. The computer-implemented method of claim 1, wherein the base data sources comprise metadata.

3. The computer-implemented method of claim 2, wherein the metadata comprises a JavaScript object notation format definition of analytical metadata.

4. The computer-implemented method of claim 1, wherein the structural definition of the application system comprises one or more of database tables, calculation views, structured query language views, table functions, and core data services.

5. The computer-implemented method of claim 1, wherein the application system is integrated with an analytics application, wherein execution of the query comprises retrieving data from the application system based on permissions from the analytics application.

6. The computer-implemented method of claim 1, further comprising:

identifying additional parameters from the query.

7. The computer-implemented method of claim 1, wherein the parameters comprise predefined functions from an analytics application.

8. A system, comprising:

at least one data processor; and at least one memory storing instructions which, when executed by the at least one data processor, result in operations comprising:

responsive to a command initiated at a browser, providing, to a browser interface coupled to the application system, a data model metadata comprising a structural definition of the application system;

generating, in response to a query initiated at the browser, a query view description including a data source and parameter description, the data source and parameter description provided by the browser;

executing the query received by the application system from the browser interface, the executing of the query comprising generating modified data sources by injecting parameters defined in the parameter description into base data sources of the application system to create a partial database query that is executed based on the modified data sources; and providing, to the browser interface, results of the execution of the query.

9. The system of claim 8, wherein the base data sources comprise metadata.

10. The system of claim 9, wherein the metadata comprises a JavaScript object notation format definition of analytical metadata.

11. The system of claim 8, wherein the structural definition of the application system comprises one or more of database tables, calculation views, structured query language views, table functions, and core data services.

12. The system of claim 8, wherein the application system is integrated with an analytics application, wherein execution of the query comprises retrieving data from the application system based on permissions from the analytics application.

13. The system of claim 8, wherein the at least one memory storing instructions which, when executed by the at least one data processor, result in further operations comprising:

identifying additional parameters from the query.

14. The system of claim 8, wherein the parameters comprise predefined functions from an analytics application.

15. A non-transitory computer-readable storage medium including program code, which when executed by at least one data processor, causes operations comprising:

responsive to a command initiated at a browser, providing, to a browser interface coupled to the application system, data model metadata comprising a structural definition of the application system;

generating, in response to a query initiated at the browser, a query view description including a data source and parameter description, the data source and parameter description provided by the browser;

executing the query received by the application system from the browser interface, the executing of the query comprising generating modified data sources by injecting parameters defined in the parameter description into base data sources of the application system to create a partial database query that is executed based on the modified data sources; and providing, to the browser interface, results of the execution of the query.

16. The non-transitory computer-readable storage medium of claim 15, wherein the base data sources comprise metadata.

17. The non-transitory computer-readable storage medium of claim 16, wherein the metadata comprises a JavaScript object notation format definition of analytical metadata.

18. The non-transitory computer-readable storage medium of claim 15, wherein the structural definition of the application system comprises one or more of database tables, calculation views, structured query language views, table functions, and core data services.

19. The non-transitory computer-readable storage medium of claim 15, wherein the application system is integrated with an analytics application, wherein execution of the query comprises retrieving data from the application system based on permissions from the analytics application.

20. The non-transitory computer-readable storage medium of claim 15, wherein the parameters comprise predefined functions from an analytics application.

* * * * *